(12) United States Patent
Wang

(10) Patent No.: US 8,340,531 B2
(45) Date of Patent: Dec. 25, 2012

(54) METHOD AND APPARATUS FOR IMPROVED SBS SUPPRESSION IN OPTICAL FIBER COMMUNICATION SYSTEMS

(75) Inventor: Jun Wang, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 424 days.

(21) Appl. No.: 12/641,495

(22) Filed: Dec. 18, 2009

(65) Prior Publication Data

US 2011/0150484 A1    Jun. 23, 2011

(51) Int. Cl.
*H04B 10/04* (2006.01)
(52) U.S. Cl. .......................... 398/194; 398/159
(58) Field of Classification Search ............ 398/159, 398/194
See application file for complete search history.

(56) References Cited

U.S. PATENT DOCUMENTS

| | | | |
|---|---|---|---|
| 5,828,477 A | 10/1998 | Nilsson et al. |
| 6,252,693 B1 | 6/2001 | Blauvelt |
| 6,282,003 B1 | 8/2001 | Logan, Jr. et al. |
| 6,490,071 B2 | 12/2002 | Logan, Jr. et al. |
| 6,535,315 B1 | 3/2003 | Way et al. |
| 6,813,448 B1 | 11/2004 | Chiappetta |
| 7,271,948 B1 | 9/2007 | Wang et al. |
| 7,349,637 B1 | 3/2008 | Frederiksen, Jr. et al. |
| 2004/0156643 A1 | 8/2004 | Frederiksen, Jr. et al. |
| 2006/0109877 A1 | 5/2006 | Caton et al. |
| 2006/0188267 A1 | 8/2006 | Gavrilovic et al. |
| 2006/0251425 A1 | 11/2006 | Kupershmidt et al. |
| 2007/0206903 A1 | 9/2007 | Kovar |

FOREIGN PATENT DOCUMENTS

| | | |
|---|---|---|
| WO | 97/18645 A1 | 5/1997 |
| WO | 97/26723 A1 | 7/1997 |
| WO | 00/72451 A2 | 11/2000 |

OTHER PUBLICATIONS

PCT Search Report & Written Opinion, RE: Application #PCT/US2010/059477; Mar. 28, 2011.
G. P. Agrawal, Nonlinear Fiber Optics, 4th ed., Academic Press, 2007, Chapter 9, pp. 329-367.

*Primary Examiner* — Leslie Pascal
(74) *Attorney, Agent, or Firm* — Stewart M. Wiener

(57) ABSTRACT

Methods of transmitting an optical signal through optical fiber in a manner suppressing stimulated Brillouin scattering (SBS) are provided. A light beam emitted from a light source is modulated by driving either the light source or a separate phase modulator or both simultaneously with a separate high frequency signal dithered by one or more low frequency dithering signals of a frequency or frequencies lower than that of the high frequency signal. Thereafter, the light beam is further modulated externally with an RF information-carrying signal. The high frequency signal is at least twice a highest frequency of the RF information-carrying signal. The light beam modulated with the RF information-carrying signal is coupled into optical fiber. The high frequency signal dithered by the one or more low frequency dithering signals spreads the optical power of the light beam in a wider spectral range thereby raising the SBS threshold power level for purposes of suppressing SBS while the undesired induced spurious frequency component level is controlled. The form of the spread spectrum is also controlled and adjusted. An optical transmitter is also disclosed.

23 Claims, 2 Drawing Sheets

METHOD AND APPARATUS FOR IMPROVED SBS SUPPRESSION IN OPTICAL FIBER COMMUNICATION SYSTEMS

FIELD OF THE INVENTION

Optical fiber communication systems are disclosed, and more particularly, methods and apparatus for reducing impairments from nonlinear effects in optical fibers when transmitting broadband, high power optical signals over long distances are disclosed.

BACKGROUND OF THE INVENTION

In optical communication systems, a light beam is modulated in accordance with information to be conveyed and transmitted along dielectric optical waveguides to a receiver. Typically, transmission of broadband signal content, such as analog multichannel video, requires the use of narrow line width light sources in conjunction with low loss, single mode optical fibers (SMF). By way of example, a typical transmitter for cable TV (CATV) operates at a wavelength of 1550 nm and includes the use of a narrow line width, continuous wave (CW) distribution feedback (DFB) laser and an external modulator.

Long distance transmission in optical fiber typically requires high fiber launch power, for instance, to achieve required signal to noise ratio. This is especially true for analog transmission systems for hybrid fiber-coax (HFC) networks and passive optical networks (PON) in which high fiber launch power enables the high signal to noise ratio requirement to be achieved and permits higher split numbers along the transmission line.

The success of optical amplifiers, such as erbium doped fiber amplifiers (EDFA) and semiconductor optical amplifiers (SOA), has essentially eliminated high launch power as a problem in most optical fiber communication applications. This is because these amplifiers permit efficient signal amplification of optical carriers around 1550 nm up to saturated output powers exceeding about 23 dBm (200 mW). This enables longer reach fiber links and the ability to optically split the signal to serve multiple users.

However, despite the use of such optical amplifiers, fiber nonlinearities limit maximum launch power into optical fiber. In particular, for a single wavelength system, stimulated Brillouin scattering (SBS) puts a limit to maximum launch power in many communication applications before the impact of other fiber nonlinearities becomes relevant. With respect to SBS impact, SBS typically only occurs when a narrow line width optical beam is launched into an optical fiber above a threshold power level. Thus, as long as the power within the SBS line width does not exceed the SBS threshold power level, SBS should remain adequately suppressed. Unfortunately, the SBS threshold power level, for instance, for standard SMF is typically in a range of only about 6-7 dBm (4-5 mW). Thus, raising the SBS threshold above 6-7 dBm (4-5 mW) so that launch power can be increased is desirable in many applications.

Brillouin scattering is an interaction of light photons with acoustic or vibrational quanta (phonons). The interaction consists of an inelastic scattering process in which a phonon is either created (Stokes process) or annihilated (anti-Stokes process). The energy of the scattered light is slightly changed, that is decreased for a Stokes process and increased for an anti-Stokes process. This shift, known as the Brillouin shift, is equal to the energy of the interaction. For intense laser light traveling in an optical fiber of very small core diameter, the variations in the electric field of the beam itself may produce acoustic vibrations in the medium via electrostriction. The beam may undergo Brillouin scattering from these vibrations, usually in opposite direction to the incoming beam.

SBS affects optical transmission systems within an optical channel and normally will not cause crosstalk between multiple optical channels because of its narrow gain spectral width. However, because of its narrow bandwidth nature, SBS is particularly detrimental to optical transmission systems having modulation schemes which generate narrow optical spectrum where most of the optical power centers in a small frequency range near optical carrier. As an example, the modulation schemes of CATV/HFC systems are typically amplitude modulation with vestigial sideband (AM-VSB) whose root mean square (RMS) modulation index is about 20% to 30% without laser clipping. Therefore, most of the energy centers within a small bandwidth around the optical carrier. Thus, SBS impacts CATV/HFC systems on carrier to noise ratios (CNR) and distortions, especially second order distortion, CSO.

In CATV/HFC systems, SBS affects the externally modulated analog systems much more than directly modulated analog systems. A first reason for this is that an external modulator exhibits almost zero modulator chirp, and thus, the power is densely centered closely around optical carrier. A second reason is that external modulators are used for longer reach because of its low chirp, and long reach requires more launch power. In directly modulated analog systems, on the other hand, a broadened optical spectrum due to the relative larger laser chirp, together with fiber dispersion, restricts link length due to performance degradation. For this reason, the directly modulated analog systems are usually used for shorter reach with a relatively lower launch power. Hence, the analog transmission systems of directly modulated lasers are less susceptible to SBS.

In general, SBS impact can be reduced in an externally modulated analog system if the optical signal's spectrum can be broadened since the energy per bandwidth is lowered. The most effective and widely used techniques for combating SBS include the use of an optical phase modulator or dithering the laser or the combination of both, in the case of external modulators.

Accordingly, the transmission quality of optical signals having relatively high intensity and narrow line width can be improved by reducing the effects of SBS which allows increase of optical signal power level and increase of propagation distance between communication links without generating additional system degradation.

SUMMARY OF THE INVENTION

Methods of suppressing stimulated Brillouin scattering (SBS) while transmitting an optical signal through optical fiber are provided. The methods allow improved SBS suppression but the resulting spurious beat is controlled. According to one contemplated method, a light beam emitted from a light source is modulated by modulating the light source with a high frequency dithering signal dithered by one or multiple dithering signal(s) of a frequency lower than that of the high frequency dithering signal. After being emitted by the light source, the light beam is further intensity modulated externally with an RF information-carrying signal. The high frequency dithering signal is at least twice a highest frequency of the RF information-carrying signal. The light beam intensity-modulated with the RF information-carrying signal is thereafter coupled into optical fiber. The high frequency dithering signal dithered by a low frequency dithering signal(s) spreads the optical power of the light beam in a wider spectral range thereby raising the SBS threshold power level for purposes of suppressing SBS.

According to another method, a light beam emitted from a light source is subject to phase modulation via a phase modulator with a high frequency dithering signal which is in turn dithered by dithering signal(s) of a frequency lower than that of the high frequency dithering signal. After or before the phase modulating step, the light beam is intensity modulated with an RF information-carrying signal externally. The high frequency dithering signal is at least twice a highest frequency of the RF information-carrying signal. The light beam modulated with the RF information-carrying signal is coupled into optical fiber and SBS is suppressed for the same reasons discussed above.

In these methods, the high frequency dithering signal dithered by the low frequency dithering signal can be dithered around a nominal frequency of the high frequency dithering signal. Also, the light source or beam can be modulated with multiple high frequency dithering signals and/or the high frequency dithering signal can be dithered about its nominal frequency by multiple low frequency dithering signals as described in the following embodiments. Multiple low frequency dithering signals allow improved SBS suppression and control of the spurious RF spectral beat component. Also, the light source can in the form of a laser, the high frequency dithering signal can be generated by a voltage controlled oscillator (VCO), and dithering of the high frequency dithering signal with the low frequency dithering signal(s) can be accomplished by modulating a bias voltage of the VCO.

An optical transmitter for an optical fiber transmission system providing suppressed stimulated Brillouin scattering (SBS) is also provided. The transmitter includes a light source, such as a laser, for emitting a light beam and an intensity modulator externally coupled to the light source to receive the light beam and modulate the light beam with a RF information-carrying signal. The transmitter can also include an oscillator that drives the light source or a separate phase modulator with a high frequency dithering signal dithered by frequency dithering signal(s) of a frequency lower than that of the high frequency dithering signal. The high frequency dithering signal is at least twice a highest frequency of the RF information-carrying signal.

As alternatives, the oscillator can be connected to the light source for driving the light source with the high frequency dithering signal dithered by the low frequency dithering signal(s), or the transmitter can include a phase modulator for phase modulating the light beam emitted from the light source before or after the light beam passes to the intensity modulator. In the later case, the oscillator can be connected to the phase modulator for modulating the light beam received by the phase modulator with the high frequency dithering signal dithered by the low frequency dithering signal(s).

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION OF THE INVENTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As discussed above, as long as the power within the SBS line width of a transmission does not exceed SBS threshold power level, SBS will remain adequately suppressed. Merely for purposes of example, a typical SBS threshold for standard SMF is generally within a range of about 6-7 dBm (4-5 mW). Thus, raising the SBS threshold above 6-7 dBm (4-5 mW) so that launch power into optical fiber can be increased is desired, particularly with respect to CATV/HFC systems.

Figure 1:
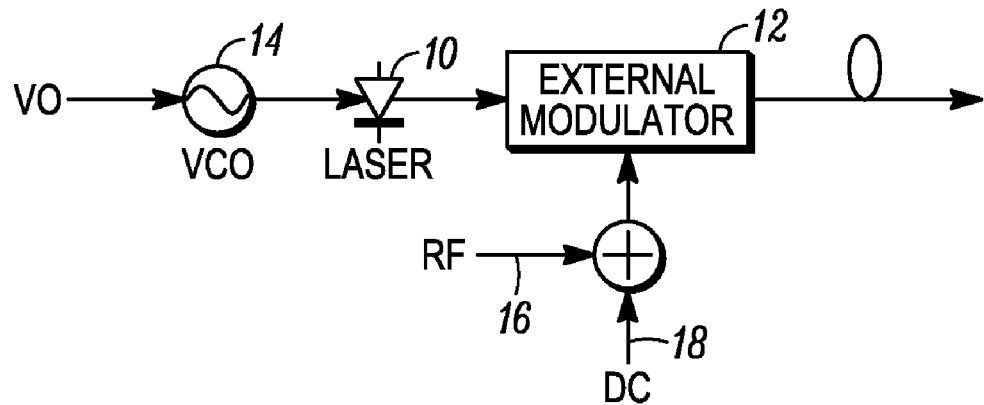
FIG. 1 is a block diagram of a transmitter portion of an optical communication system having an externally modulated transmitter and in which SBS suppression is obtained by laser dithering.
Figure 2:
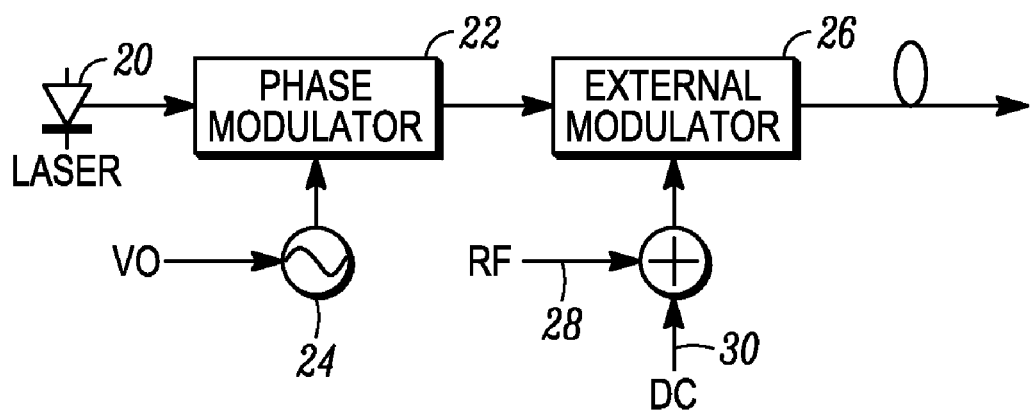
FIG. 2 is a block diagram of a transmitter portion of an optical communication system having an externally modulated transmitter and in which SBS suppression is obtained via use of an optical phase modulator.

Transmitter portions of optical transmission systems are shown in FIGS. 1 and 2. Both of these transmitter portions can be utilized to move the SBS threshold to a higher level as compared to a case where no SBS suppression measure is taken. FIG. 1 relates to a technique for reducing SBS impact on an externally modulated optical transmission system by directly dithering the laser used as the light source of the external modulation system. In contrast, FIG. 2 relates to an alternative approach for reducing SBS impact on an externally modulated optical transmission system with the use of an optical phase modulator.

In FIG. 1, the output of a laser 10 is optically coupled to an input port of an external intensity modulator 12 via a length of optical fiber or an optical coupler/waveguide. A voltage controlled oscillator (VCO) 14 provides a high frequency signal in the several gigahertz range to modulate the current which drives the laser 10. $V_0$ is the VCO bias. The RF analog modulating information carrying signal 16, for instance for CATV, is coupled with a DC bias 18 and is applied to an RF input port of the external modulator 12. The light output from modulator 12 is typically coupled to an EDFA (not shown) which launches the output optical signal into an optical fiber span (not shown) and ultimately to one or more receivers (not shown).

In FIG. 2, the output of a laser 20 is optically coupled to an input port of an external phase modulator 22. A voltage controlled oscillator (VCO) 24 provides a high frequency signal in the several gigahertz range to the phase modulator 22 with $V_0$ being the VCO bias. The output of the phase modulator 22 is coupled to the input of the external intensity modulator 26 via a length of optical fiber or an optical coupler. The RF analog modulating information carrying signal 28, for instance for CATV, is coupled with a DC bias 30 and is applied to an RF input port of the external modulator 26. The light output from modulator 26 is typically coupled to an EDFA (not shown) which launches the output optical signal into an optical fiber span (not shown) and ultimately to one or more receivers (not shown).

The dithering effect of the laser 10 shown in FIG. 1 may be mathematically expressed, as follows:

$$E = \sqrt{P_0 \left[1 + \sum_{h=1}^{u} m_h \cos(\omega_h t + \phi_h)\right]} \exp j \quad (1)$$

$$\left[\omega_0 t + \sum_{h=1}^{u} m_{fm} \sin(\omega_h t + \phi_h)\right]$$

$$= \exp j\omega_0 t$$

$$\sqrt{P_0 \left[1 + \sum_{k=1}^{u} m_h \cos(2\pi f_{rf} t + \phi_h)\right]}$$

$$\prod_{h=1}^{u} \sum_{n=-\infty}^{\infty} J_n(m_{fm}) \exp jn(\omega_h t + \phi_h)$$

where $P_0$ is the optical power of the laser; $m_h$ and $m_{fm}$ are respectively the amplitude and FM modulation index of dither signal respectively; $\omega_h$ and $\phi_h$ are respectively the frequency and initial phase of the dither signal; $\omega_0$ is the frequency of the optical carrier; $J_n$ is Bessel function of the first kind; and u is the number of the dither tones.

Likewise, SBS suppression with the phase modulator 22 of FIG. 2 may be mathematically expressed, as follows:

$$E = \sqrt{P_0} \exp j \left[\omega_0 t + \sum_{h=1}^{u} m_h \sin(\omega_h t + \phi_h)\right] \quad (2)$$

$$= \exp j\omega_0 t \sqrt{P_0} \prod_{h=1}^{u} \sum_{n=-\infty}^{\infty} J_n(m_{fm}) \exp jn(\omega_h t + \phi_h)$$

It is clear from the above equations, (1) and (2), that the new frequency components, $m\omega_h$, around the optical carrier $\omega_0$ were generated which spreads the optical power in a wider spectral range and therefore lowers the energy at the frequency of the original optical carrier. In such a way, the SBS threshold is significantly raised by the arrangements shown in FIGS. 1 and 2.

For ease of discussion, the laser dithering tone(s) of the arrangement shown in FIG. 1 or the phase modulation tone(s) of the arrangement shown in FIG. 2 are called high frequency dithering tone(s) because their frequencies are at least twice the highest RF modulation signal frequency and because of the fact that FM modulation and phase modulation produce similar results in both mathematics and spectrum.

Although the above approaches shown in FIG. 1 and FIG. 2 can help move the SBS threshold to a higher level as compared to a case where no SBS suppression measure is taken, still further improvements to the SBS threshold is desired so that yet higher launch power can be achieved for longer distance and/or more splits.

If the modulation index of the dither tone is close to 100% or phase modulation is close to its maximum value, it is clear that room for further improving SBS threshold is very limited. Besides, due to the non-uniform nature of the FM spectrum, even if the dithering or phase modulation is close to its maximum it may not generate efficient SBS suppression. Multiple high frequency tones can also be adopted in direct laser dithering or optical phase modulation or the combination of the direct laser dithering and optical phase modulation.

In such an approach all the high frequencies and their spacing should be no less than twice the signal bandwidth. The higher frequency VCO and required driver circuit impose a complexity and higher cost of transmitter design. It is therefore desirable not only to achieve improved SBS suppression, but also, to achieve improved SBS suppression in a relatively simple and cost effective way, for instance, via the use of a single high frequency VCO.

SBS suppression according to the arrangements shown in FIGS. 1 and 2 can be further improved by the use of lower frequency dither tone(s) to dither the VCO bias voltage so that the generated frequency out of VCO alters around its average (nominal) value which is set by its bias voltage, $V_0$. Examples of such improved arrangements are illustrated in FIGS. 3 and 4 for cases of direct laser dithering (FIG. 3) and optical phase modulation (FIG. 4).

Use of multiple low dither tones allows improved SBS suppression and keeps the undesirable spurious tone below a required level. Control of each low frequency dithering tone amplitude allows even spectral power distribution in the spectrum of the dither high frequency dither tone. This is further explained below.

Figure 3:
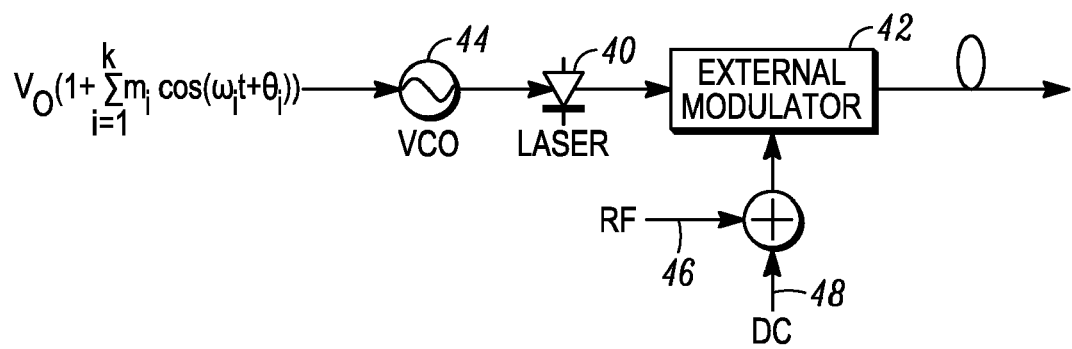
FIG. 3 is a block diagram of a transmitter portion of an optical communication system having an externally modulated transmitter and in which SBS suppression is improved by dithering VCO frequency of the laser.
Figure 4:
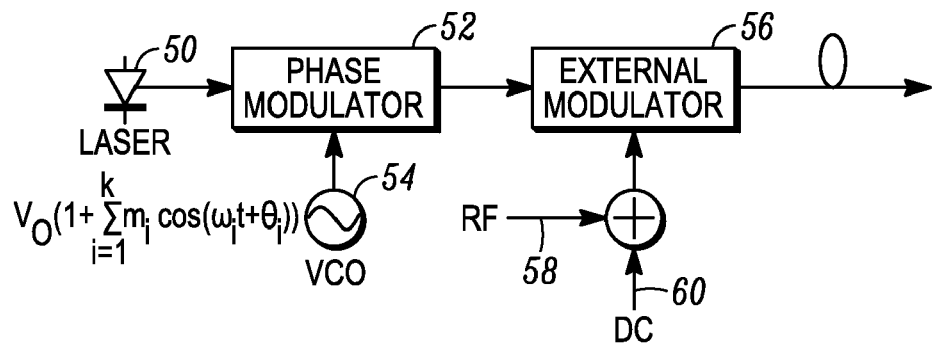
FIG. 4 is a block diagram of a transmitter portion of an optical communication system having an externally modulated transmitter and in which SBS suppression is improved by dithering phase modulation tone.

Similar to FIG. 1, the output of the laser 40 in FIG. 3 is optically coupled to an input port of an external intensity modulator 42 via a length of optical fiber or an optical coupler/waveguide. The RF analog modulating information carrying signal 46, for instance for CATV, is coupled with a DC bias 48 and is applied to an RF input port of the external modulator 42. The light output from modulator 42 is typically coupled to an EDFA (not shown) which launches the output optical signal into an optical fiber span (not shown) and ultimately to a receiver (not shown). A difference between the embodiments shown in FIGS. 1 and 3 is that the voltage controlled oscillator (VCO) 44 which modulates the driving current of the laser 40 has a VCO bias defined as follows:

$$V_0 \left(1 + \sum_{l=1}^{k} m_l \cos(\omega_l t + \theta_l)\right).$$

Likewise, similar to FIG. 2, the output of the laser 50 in FIG. 4 is optically coupled to an input port of an external phase modulator 52. The output of the phase modulator 52 is coupled to the input of the external intensity modulator 56 via a length of optical fiber or an optical coupler/waveguide. The RF analog modulating information carrying signal 58, for instance for CATV, is coupled with a DC bias 60 and is applied to an RF input port of the external modulator 56. The light output from modulator 56 is typically coupled to an EDFA (not shown) which launches the output optical signal into an optical fiber span (not shown) and ultimately to a receiver (not shown). A difference between the embodiments shown in FIGS. 2 and 4 is that the voltage controlled oscillator (VCO) 54 has a VCO bias of:

$$V_0 \left(1 + \sum_{l=1}^{k} m_l \cos(\omega_l t + \theta_l)\right).$$

From FIG. 3, it can be seen that a modulation of the VCO's bias voltage around its average value generates a high dither tone at the frequency of $\omega_h$. The modulation of the VCO bias dithers the VCO's frequency and further spreads the optical spectrum. The mathematical expression of the above approach of the direct dithering of the laser diode may be expressed as follows:

$$E = \sqrt{P_0\left\{1 + m_h \cos\left[\left(\omega_h\left(1 + \sum_{l=1}^{k} m_l \sin(\omega_l t + \varphi_l)\right)t + \phi_h\right]\right\}} \exp j \quad (3)$$

$$\left\{\omega_0 t + \Delta f \int_0^t \cos\left[\omega_h\left(1 + \sum_{l=1}^{k} m_l \sin(\omega_l t + \varphi_l)\right)t + \phi_h\right] dt\right\}$$

$$\approx \sqrt{P_0\left\{1 + m_h \cos\left[\left(\omega_h\left(1 + \sum_{l=1}^{k} m_l \sin(\omega_l t + \varphi_l)\right)t + \phi_h\right]\right\}} \exp j$$

$$\left\{\omega_0 t + m_{fm} \sin\left[\omega_h\left(1 + \sum_{l=1}^{k} m_l \sin(\omega_l t + \varphi_l)\right)t + \phi_h\right]\right\}$$

$$= \exp j\omega_0 t \sqrt{P_0\left\{1 + m_h \cos\left[\left(\omega_h\left(1 + \sum_{l=1}^{k} m_l \sin(\omega_l t + \varphi_l)\right)t + \phi_h\right]\right\}} \times$$

$$\sum_{n=-\infty}^{\infty} J_n(m_{fm}) \exp jn(\omega_h t + \phi_h) \prod_{l=1}^{k} \sum_{q=-\infty}^{\infty} J_m(n\omega_h t m_l) \exp jq(\omega_l t + \varphi_l)$$

where $m_l$ is the modulation index of the VCO bias voltage dithering signal; $\omega_l$ and $\phi_l$ are respectively the frequency and initial phase of a VCO bias voltage dithering signal; and k is the number of the VCO dithering signals. The frequencies ($\omega_l$) of the VCO dithering signals are assumed much lower than that of the high nominal VCO frequency ($\omega_h$) for mathematical simplicity although it may not be in real practical implementation.

The mathematical expression of the approach illustrated in FIG. 4 with respect to the direct dithering of the modulation tone of the optical phase modulator may be expressed as follows:

$$E = \sqrt{P_0} \exp j\left\{\omega_0 t + m_{fm} \cos\left[\omega_h\left(1 + \sum_{l=1}^{k} m_l \sin(\omega_l t + \varphi_l)\right)t + \phi_h\right]\right\} \quad (4)$$

$$= \exp j\omega_0 t \sqrt{P_0} \times \sum_{n=-\infty}^{\infty} J_n(m_{fm}) \exp jn\left(\omega_h t + \phi_h + \frac{\pi}{2}\right)$$

$$\prod_{l=1}^{k} \sum_{q=-\infty}^{\infty} J_m(n\omega_h t m_l) \exp jq(\omega_l t + \varphi_l)$$

From the equations (3) and (4) provided above, it is clear that some new frequencies $m\omega_l$ are generated that further expand the spectrum and thus further improve SBS suppression. It should be pointed out that for the case of direct laser dithering, the spectrum is decided not only by FM modulation as represented by the exponential part in equation (3) but also by AM modulation as represented by the part of square root in the equation of (3). The real spectrum of the dither laser is the combined effect of FM and AM modulation.

Practically, the choice of $\omega_h$ and $\omega_l$ are limited by the applications. For the application of CATV/HFC, $\omega_h$ should be at least twice as much as signal bandwidth to avoid beat-down interference. For $\omega_l$, it is limited by the bandwidth of the phase lock loop (PLL) circuit and some other phenomenon so the frequency of $\omega_l$ is generally low. Solely by way of example, the high frequency $\omega_h$ can exceed at least twice the highest frequency of the information carrying signal, such as 2 to 5 GHz, and the low frequency of $\omega_l$ can be several kilohertz such as within a range of about 1 to 100 KHz.

The equation (1) shows that for a laser with a limited chirp, the modulation index $m_h$ should be set high in order to generate broad spectrum because the frequency swing of the dithering (FM modulation bandwidth) decides how many sideband spectral components $n\omega_h$ can be significant in the spread optical spectrum. Likewise in the case of optical phase modulation as shown in equation (2), the modulation index should also be set high because phase modulation and frequency modulation are basically similar in generating frequency components. By the same token, the modulation index of the low VCO dithering frequencies may also need to be large to have a wide spectrum spread as shown in equation (3) and (4).

The low dithering frequency that dithers the VCO oscillation frequency (high dithering frequency), which is added onto the high dithering frequency, has several advantages. First, as mentioned earlier, when the modulation index of the high frequency tone is close to 100% in the case of direct laser dithering, the room for further increasing its modulation amplitude is very limited. Thus, the low dithering tone(s) helps further widen the spectrum and in turn improves SBS suppression without requiring a change of the modulation index of the high frequency dithering signal(s). Second, even if there is room for further increasing the modulation index of the high frequency dithering or phase modulation signal, the widely spread optical spectrum will cause response roll-off of RF signal modulation at the end of the transmission line because of the phase change difference at each different optical spectral component. The level of the roll-off is decided by a profile of the broadened optical spectrum and the lengths of the optical fiber along the transmission line. The fact that low frequency dithering helps improve SBS suppression without changing modulation index of the high dithering frequency tone(s) helps the control of the RF modulation response roll-off and provides a clear advantage.

When a single low frequency tone of $\omega_l$ is applied, the improvement of SBS suppression compared to the case of no VOC bias modulation may easily be seen, in a similar way to the equation (1) and equation (2), from equation (3) and equation (4). Similarly, a further improvement may be achieved by increasing the modulation index of the modulation tone, $\omega_l$. However, increase of modulation index is limited by the fact that fiber dispersion can turn this modulation into an amplitude component, which will appear in every channel of the HFC signal band. This component becomes an unwanted in-band spurious spectral component. With the requirement of carrier to spurious component ratio, this spurious term should be controlled below a specified level. Controlling this spurious level requires the control of the modulation index of the low frequency dithering tone and this puts in conflict the requirement for widely spreading the spectrum. The problem of the spurious component in case of the short link length may not be as serious as that in case of the long link length due to the difference in the amount of fiber dispersion and the lower required fiber launch power for typical HFC applications. However for the PON applications, this may not be true even if the link length is not very long. This problem may be solved by applying multiple of the low frequency dithering tones.

The benefit of multiple low dithering tones may be simply understood as follows. First, the total amplitude of the low frequency dithering tones is larger compared to the single dithering tone. For instance, for two sinusoidal tones, the total amplitude of the dithering signals may be expressed as follows:

$$m\cos(\omega_{f1} t) + m\cos(\omega_{f2} t) = 2m\cos\left(\frac{\omega_{f1}+\omega_{f2}}{2}t\right)\cos\left(\frac{\omega_{f1}-\omega_{f2}}{2}t\right) \quad (5)$$

where the modulation index of the two dithering tones, $\omega_{f1}$ and $\omega_{f2}$, is assumed to be the same and represented by m. It is seen from equation (5) that when $\omega_{f1} \approx \omega_{f2}$, the equation becomes:

$$m\cos(\omega_{f1}t) + m\cos(\omega_{f2}t) \approx 2m\cos(\omega_{f1}t) \approx 2m\cos(\omega_{f2}t). \quad (6)$$

The total amplitude of the dithering tones in this case is almost doubled but the carrier to spurious component ratio is still decided by each single dithering tone. Also, when $\omega_{f1}$ and $\omega_{f2}$ are not close to each other the total peak amplitude of the combined low frequency dithering tone is still close to twice that of a single tone. This may bring some advantages in SBS suppression for different link lengths of the transmission fibers. This is because short fiber may not "see" the slow spectrum change caused by very low dithering frequency but the dithering tone of higher frequency is more helpful. In the mean time, short fiber may allow relatively higher modulation index as compared to the long fiber link because of smaller dispersion. Adjusting the modulation index of the individual dithering tone may help optimize the SBS suppression for different link lengths of the transmission optical fiber because it balances the frequency amplitude as seen in (3) and (4) in the amplitude coefficient of low frequency components in addition to increasing the total dither amplitude.

Multiple low frequency dither tones can also be achieved with use of different wavelength forms. For example, one can use square wave or triangle wave to serve the same purpose. This is because those waveforms can be expressed in multiple tone series using the well known Fourier transform. Adjusting the parameters of the waveforms, such as amplitude, shape and duty ratio etc., helps adjust the low frequency dither signal spectrum, which in turn helps adjust effectiveness of and improve the SBS suppression. Besides, the use of different waveforms may help reduce the design complexity.

While embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

I claim:

1. A method of suppressing stimulated Brillouin scattering while transmitting an optical signal through optical fiber, comprising the steps of:
    emitting a light beam from a light source;
    during said emitting step, modulating the light source with a high frequency signal that is frequency modulated by one or more low frequency dithering signals of a frequency or frequencies lower than that of the high frequency signal;
    amplitude modulating the light beam externally of the light source with an RF information-carrying signal, the high frequency signal being at least twice a highest frequency of the RF information-carrying signal; and
    coupling the light beam modulated with the RF information-carrying signal into the optical fiber.

2. A method according to claim 1, wherein the high frequency signal dithered by the one or more low frequency dithering signals is dithered around a nominal frequency of the high frequency signal.

3. A method according to claim 1, wherein the light source is a laser, wherein the high frequency signal is generated by a voltage controlled oscillator (VCO), and wherein dithering the high frequency signal with the low frequency dithering signal is accomplished by modulating a bias voltage of the VCO.

4. A method according to claim 3, wherein a form of the modulated bias voltage is selected from the group consisting of a sinusoidal waveform, a square waveform, and a triangular waveform.

5. A method according to claim 1, wherein the frequency of the low frequency dithering signal is within a range of 1 to 100 KHz and the RF information-carrying signal is a cable TV signal.

6. A method of suppressing stimulated Brillouin scattering while transmitting an optical signal through optical fiber, comprising the steps of:
    emitting a light beam from a light source;
    during said emitting step, modulating the light source with a high frequency signal dithered with multiple low frequency dithering signals of a frequency or frequencies lower than that of the high frequency signal;
    amplitude modulating the light beam externally of the light source with an RF information-carrying signal, the high frequency signal being at least twice a highest frequency of the RF information-carrying signal; and
    coupling the light beam modulated with the RF information-carrying signal into the optical fiber.

7. A method of suppressing stimulated Brillouin scattering while transmitting an optical signal through optical fiber, comprising the steps of:
    emitting a light beam from a light source;
    during said emitting step, modulating the light source with multiple high frequency signals dithered with one or more low frequency dithering signals of a frequency or frequencies lower than that of the high frequency signals;
    amplitude modulating the light beam externally of the light source with an RF information-carrying signal, the high frequency signal being at least twice a highest frequency of the RF information-carrying signal; and
    coupling the light beam modulated with the RF information-carrying signal into the optical fiber.

8. A method of suppressing stimulated Brillouin scattering while transmitting an optical signal through optical fiber, comprising the steps of:
    emitting a light beam from a light source;
    modulating the light beam emitted from the light source with an optical phase modulator with a high frequency signal which is in turn frequency modulated by one or more low frequency dithering signals of a frequency or frequencies lower than that of the high frequency signal;
    before or after said phase modulating step, intensity modulating the light beam externally of the light source with an RF information-carrying signal, the high frequency signal of the phase modulating step being at least twice a highest frequency of the RF information-carrying signal; and
    coupling the light beam modulated with the RF information-carrying signal into the optical fiber or into an input of the optical phase modulator and then into the optical fiber from an output of the phase modulator.

9. A method according to claim 8, wherein the high frequency signal dithered by the one or more low frequency dithering signals is dithered around a nominal frequency of the high frequency signal.

10. A method according to claim 8, wherein the light source is a laser, wherein the high frequency signal is generated by a voltage controlled oscillator (VCO), and wherein dithering the high frequency signal with the one or more low frequency dithering signals is accomplished by modulating a bias voltage of the VCO.

11. A method according to claim 10, wherein a form of the modulated bias voltage is selected from the group consisting of a sinusoidal waveform, a square waveform, and a triangular waveform.

12. A method according to claim 8, wherein the frequency of the low frequency dithering signal is within a range of 1 to 100 KHz and the RF information-carrying signal is a cable TV signal.

13. A method of suppressing stimulated Brillouin scattering while transmitting an optical signal through optical fiber, comprising the steps of:
    emitting a light beam from a light source;
    modulating the light beam emitted from the light source with an optical phase modulator with a high frequency signal which is in turn dithered with multiple low frequency dithering signals of a frequency or frequencies lower than that of the high frequency signal;
    before or after said phase modulating step, intensity modulating the light beam externally of the light source with an RF information-carrying signal, the high frequency signal of the phase modulating step being at least twice a highest frequency of the RF information-carrying signal; and
    coupling the light beam modulated with the RF information-carrying signal into the optical fiber or into an input of the optical phase modulator and then into the optical fiber from an output of the phase modulator.

14. A method of suppressing stimulated Brillouin scattering while transmitting an optical signal through optical fiber, comprising the steps of:
    emitting a light beam from a light source;
    modulating the light beam emitted from the light source with an optical phase modulator with multiple high frequency signals dithered by one or more low frequency dithering signals of a frequency or frequencies lower than that of the high frequency signals;
    before or after said phase modulating step, intensity modulating the light beam externally of the light source with an RF information-carrying signal, the high frequency signal of the phase modulating step being at least twice a highest frequency of the RF information-carrying signal; and
    coupling the light beam modulated with the RF information-carrying signal into the optical fiber or into an input of the optical phase modulator and then into the optical fiber from an output of the phase modulator.

15. An optical transmitter for an optical fiber transmission system providing suppressed stimulated Brillouin scattering (SBS), comprising:
    a light source emitting a light beam;
    an intensity modulator that is externally coupled to the light source to receive the light beam and that is driven by an information-carrying RF signal for modulating the light beam externally of the light source with the RF information-carrying signal; and
    an oscillator driving at least one of said light source or a separate optical phase modulator with a high frequency signal that is frequency modulated by one or more low frequency dithering signals of a frequency or frequencies lower than that of the high frequency dithering signal, the high frequency signal being at least twice a highest frequency of the RF information-carrying signal.

16. An optical transmitter according to claim 15, wherein said oscillator includes one or more oscillators driving both said light source and said separate optical phase modulator simultaneously with respective high frequency signals dithered by said one or more low frequency dithering signals of a frequency or frequencies lower than that of the high frequency dithering signal.

17. An optical transmitter according to claim 15, wherein said oscillator is connected to said light source for driving said light source with the high frequency signal dithered by the one or more low frequency dithering signals.

18. An optical transmitter according to claim 15, further comprising an optical phase modulator for phase modulating the light beam emitted from the light source before or after the light beam passes to said intensity modulator, wherein said oscillator is connected to said optical phase modulator for modulating the phase of the light beam received by the optical phase modulator with the high frequency signal dithered by the one or more low frequency dithering signals.

19. An optical transmitter according to claim 15, wherein the optical transmitter includes only one of said oscillator.

20. An optical transmitter according to claim 15, wherein said light source is a laser, wherein said oscillator is a voltage controlled oscillator (VCO) which generates the high frequency signal, and wherein a bias voltage applied to said VCO provides the one or more low frequency dithering signals by which the high frequency signal is dithered.

21. An optical transmitter according to claim 20, wherein a form of said bias voltage is selected from the group consisting of a sinusoidal waveform, a square waveform, and a triangular waveform, wherein the frequency of the low frequency dithering signal is within a range of 1 to 100 KHz, and wherein said RF information-carrying signal is a cable TV signal.

22. An optical transmitter according to claim 15, wherein the oscillator drives at least one of said light source or said separate optical phase modulator with a high frequency signal dithered with multiple low frequency dithering signals of a frequency or frequencies lower than that of the high frequency signal.

23. An optical transmitter according to claim 15, wherein the oscillator drives at least one of said light source or said separate optical phase modulator with multiple high frequency signals dithered with one or more low frequency dithering signals of a frequency or frequencies lower than that of the high frequency signals.

* * * * *